(12) United States Patent
Jeng

(10) Patent No.: US 7,352,360 B2
(45) Date of Patent: Apr. 1, 2008

(54) MULTI-TRAIL SPOT CLICK-EVENT DETECTION METHOD

(75) Inventor: Sheng-Wen Jeng, Jhubei (TW)

(73) Assignee: Industrial Technology Research Institute, Chutung, Hsinchu (TW)

( * ) Notice: Subject to any disclaimer, the term of this patent is extended or adjusted under 35 U.S.C. 154(b) by 1047 days.

(21) Appl. No.: 10/747,054

(22) Filed: Dec. 30, 2003

(65) Prior Publication Data

US 2005/0083249 A1    Apr. 21, 2005

(30) Foreign Application Priority Data

Oct. 20, 2003    (TW) .............................. 92128998 A

(51) Int. Cl.
*G09G 5/00*    (2006.01)

(52) U.S. Cl. .............. 345/157; 345/1.1; 345/156; 348/744; 353/32; 353/42; 356/375

(58) Field of Classification Search ............ 345/1.1, 345/156, 157, 175, 183, 207, 690; 348/744; 353/42; 356/375; 362/259
See application file for complete search history.

(56) References Cited

U.S. PATENT DOCUMENTS

| | | | | |
|---|---|---|---|---|
| 5,115,230 A * | 5/1992 | Smoot | ............................. | 345/9 |
| 5,914,783 A * | 6/1999 | Barrus | .......................... | 356/614 |
| 6,275,214 B1 * | 8/2001 | Hansen | ......................... | 345/158 |
| 6,323,839 B1 * | 11/2001 | Fukuda et al. | ............... | 345/157 |
| 6,331,848 B1 * | 12/2001 | Stove et al. | ................. | 345/156 |
| 6,346,933 B1 * | 2/2002 | Lin | ............................. | 345/157 |
| 6,512,507 B1 * | 1/2003 | Furihata et al. | .............. | 345/157 |

OTHER PUBLICATIONS

Carsten Kirstein et. al., *Interaction with a Projection Screen Using a Camera-tracked Laser Pointer*, University of Dortmund, D-44221 Dortmund, Germany, Oct. 29, 2001.
Dan R. Olsen et. al., *Laser pointer interaction*, Brigham Young University, Provo, UT, Oct. 29, 2001.
James Davis et. al., *Lumipoint: multi-user laser-based interaction on large tiled displays*, Stanford University, Stanford, CA, Oct. 29, 2001, pp. 205-211.

* cited by examiner

*Primary Examiner*—Richard Hjerpe
*Assistant Examiner*—Vincent E. Kovalick
(74) *Attorney, Agent, or Firm*—Bacon & Thomas, PLLC

(57) ABSTRACT

A multi-trail spot click-event detection method is disclosed, which uses a camera to capture a plurality of consecutive images from a display screen. The camera is connected to a host and sends the consecutive images to the host for determining if a click-event occurs. Firstly, pixels of each difference image with the brightness difference in a predetermined range are selected to form blobs. Next, possible spots of the blobs in each difference image are found. Then, the possible spots found are assigned to a specific trail. Finally, when a spot of the specific trail is absent at a next time point immediately after the spot is presented, occurrence of a click-event is detected.

10 Claims, 6 Drawing Sheets

MULTI-TRAIL SPOT CLICK-EVENT DETECTION METHOD

BACKGROUND OF THE INVENTION

1. Field of the Invention

The present invention relates to the technical field of spot click-event detection and, more particularly, to a multi-trail spot click-event detection method.

2. Description of Related Art

A projector is generally used in conferences or 3D games for casting the content of a computer screen on a curtain, to offer multiple users concurrently to view and discuss topics or play interactive games. However, such a way has many inherent difficulties. For example, for a conference report, a speechmaker uses a laser pen for directing the conference report and a computer mouser for, e.g., changing pages, browsing contents and/or selecting files. This makes the speechmaker appear bustle. In addition, if an operator for changing pages, browsing contents and/or selecting files is added, a mismatch may occur between the speechmaker and the operator. For example, the operator changes a new page because of misunderstanding of the speechmaker's gestures. Further, a substitute for the operator or a user may need to exchange the seats and/or update computer files (such as in an interactive game or an on-line discussion), which is very inconvenient.

To overcome the aforementioned problem, an image capture device (such as PC-camera) is added in the system to monitor a projection screen such that the laser pen can directly be operated on the projection screen. Moreover, detecting and decoding the laser spot's motions in combination with an image analysis and interactive control software can replace the mouse operations. Such a laser pen can overcome the problem to achieve multi-interaction environment. Attendants can use their laser pens for remotely controlling system operation on the projection screen.

U.S. Pat. No. 6,275,214 granted to Hansen for a "Computer presentation system and method with optical tracking of wireless pointer" discloses spot detection steps including: (1) subtraction of a current image and a previous image; (2) comparison of a result (image) after the subtraction and predetermined spot's properties (brightness, color and shape) for filtering different pixels and remaining similar ones; (3) searching the optimal one from the remainders (i.e., possible spots) as a target laser spot; and (4) confirmation a click action when the target laser spot is detected in a small area several consecutive times. However, the system can detect moving spot only. A spot positioned on a fixed small area may not be detected. The predetermined spot's properties can greatly limit the comparison. For example, when the system environment such as projection curtain's size and background light changes, a spot may not be detected or a noise may be detected as a spot.

U.S. Pat. No. 6,346,933 granted to Lin for an "Interactive display presentation system" also discloses a spot detection method, which is similar to the U.S. Pat. No. 6,275,214 except that it applies "brightness" of a spot to the subtraction step and the filtering step. Next, a trail of consecutive spot positions is recorded and analyzed to determine if one of predefined "gestures" is met, and if yes, a related control command is generated. However, the accuracy of such a system may not be reliable due to unstable spot detection. This is because unstable consecutive spot positions may form an undefined gesture, resulting in failure of gesture analysis and generation of error control command. In this case, a "learning" step for the predefined gestures is required, and a new user needs to learn the system again. Accordingly, the system complexity in use is significantly increased.

U.S. Pat. No. 5,115,230 granted to Smoot for a "Light-pen system for projected images" discloses a semi-transparent projection screen laterally located by a projector and an imaging device in front of which a filter is added such that only red laser light can pass through the filter. Therefore, such a spot detection is very simple, i.e., only the "brightness" of spots is applied to image subtraction and threshold filtering. However, due to the semi-transparent projection screen, such a system is very expensive and special so that implementation cost for such a system cannot be reduced.

SUMMARY OF THE INVENTION

The object of the present invention is to provide a multi-trail spot click-event detection method, which can avoid the prior art problems that a stationary spot in a fixed small area cannot be detected and the "learning" step causes an inconvenience.

To achieve the object, a multi-trail spot click-event detection method is provided. The detection method applies a spot to perform click-event operation on a display screen and uses a camera connected to a host to capture multiple images from the display screen at consecutive time points. The detection method includes: a possible spot finding step, which subtracts every two consecutive images captured by the camera to thus obtain difference images, and selects pixels of each difference image with brightness in a first determined range to thus form blobs (connected regions); a possible spot determining step, which finds a first blob from the blobs of each difference image that has an area in a second predetermined range, and regards spots of the first blob found as possible spots; a multi-trail handling step, which sets start data for at least one trail array and subsequently classifies the possible spots in each difference image into the at least one trail array; a click-event detecting step, which determines if there is a consecutive spot motion in accordance with a spot in the at least one trail array existing at a next time point or not, and thus decides that a click-event occurs when the spot is absent at the next time point immediately after the spot is presented.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
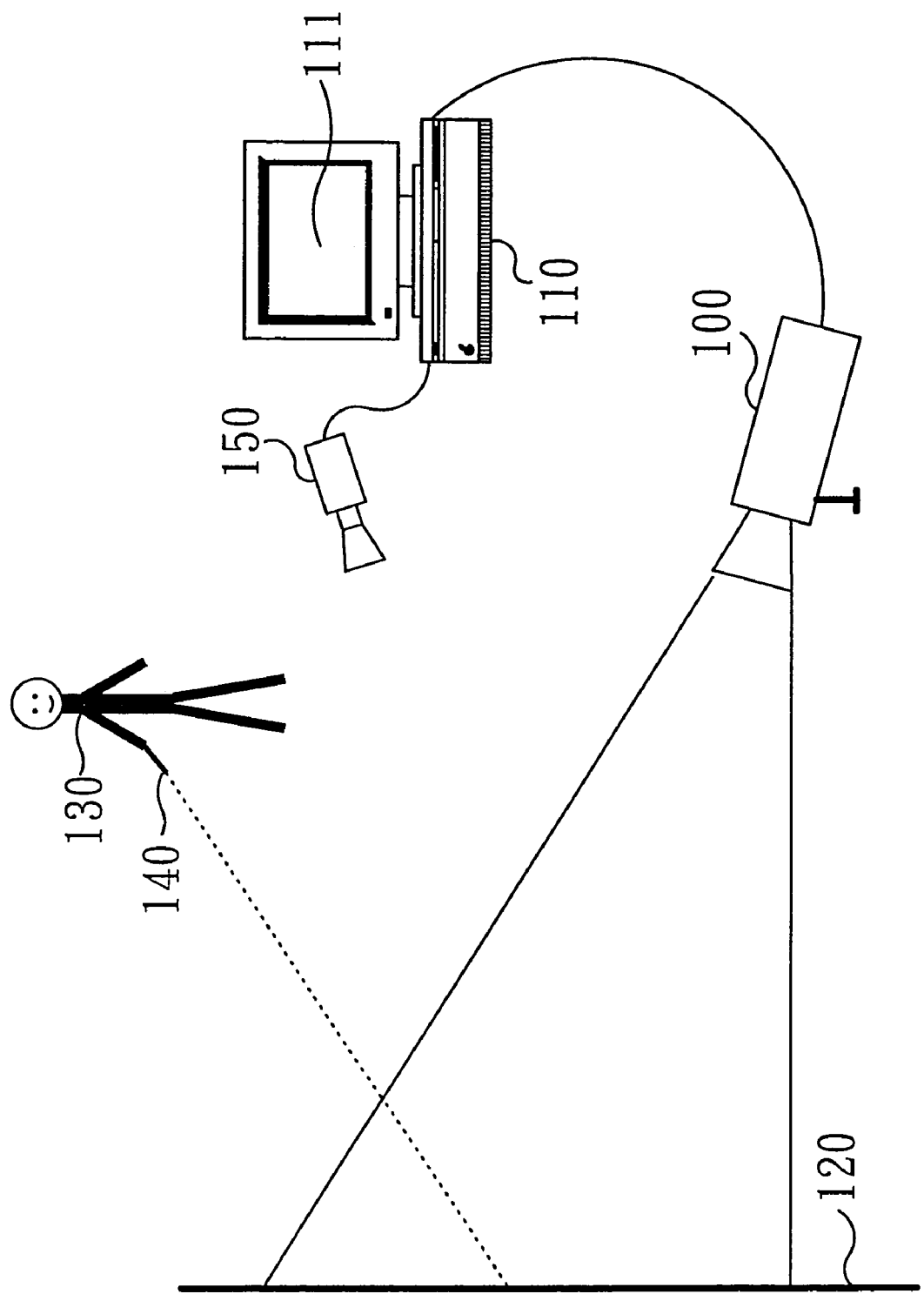
FIG. 1 is a schematic diagram of a system with a multi-trail spot click-event detection method in accordance with the invention.

FIG. 1 shows a schematic diagram of a system for performing a multi-trail spot click-event detection method in accordance with the invention. In FIG. 1, the system is a configuration including a projector 100 to project the content of a screen 111 of a host 110 on a projection screen or curtain 120. As shown in FIG. 1, in this configuration, a user 130 uses a laser pen 140 to emit a laser light to thus form spot on the projection screen 120. A camera 150 captures multiple images from the projection screen 120 at consecutive time points. The user 130 turns on and then off the laser pen 140 to make a spot appear on the projection screen 120 and then disappear, thereby performing a click-event on the projection screen 120.

Figure 2:
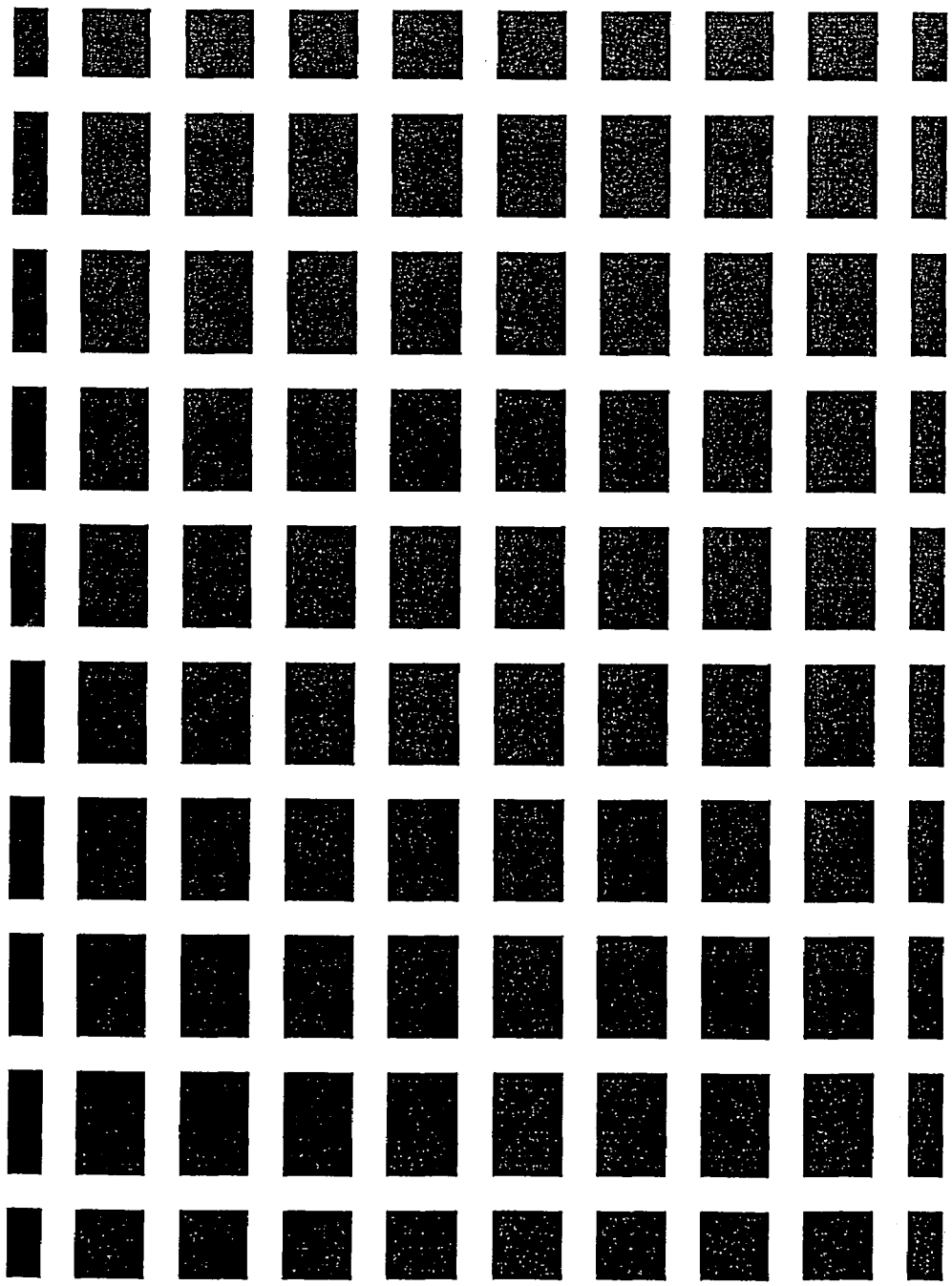
FIG. 2 is a schematic chart of lattice "alignment" pattern in accordance with the invention.

Before using the system, it needs to construct and calibrate the camera 150. After the system and the camera 150 are constructed, a calibration for establishing coordinate relationship between an image captured by the camera and the projection screen 120 is performed by a user to set required system parameters using a typical input device (i.e., a mouse or keyboard). Firstly, a calibration pattern with M×N (e.g., in this embodiment, 8×8) effective lattices is pre-designed, as shown in FIG. 2, which is displayed on the screen 111 of the host 110. Next, the projector 100 projects the pattern of the screen 111 on the projection screen 120. At this point, imaging is set as real-time image mode, and position of the camera 150 is adjusted with respect to the projection screen 120 such that imaging area is slightly larger than an area of the alignment pattern on the projection screen 120. Next, the image is frozen, the host 110 detects intersections of the effective lattices through the camera 150 and thus coordinate systems of the image and the screen 111 are calibrated by camera calibration. When the calibration is complete, calibration data for coordinate conversion between the camera 150 (imaging device) and the projection screen 120 at this point is prepared and also stored to complete a configuration procedure of the camera 150. Otherwise, adjustment of the position of the camera 150 or the imaging parameters (such as focus, brightness, contrast and the like) is necessary and subsequently the cited steps are repeated until the calibration is successful. It is noted that since the calibration is successful, the position of the camera 150 and the parameters cannot be changed, otherwise the calibration procedure needs to be performed again.

Figure 3:
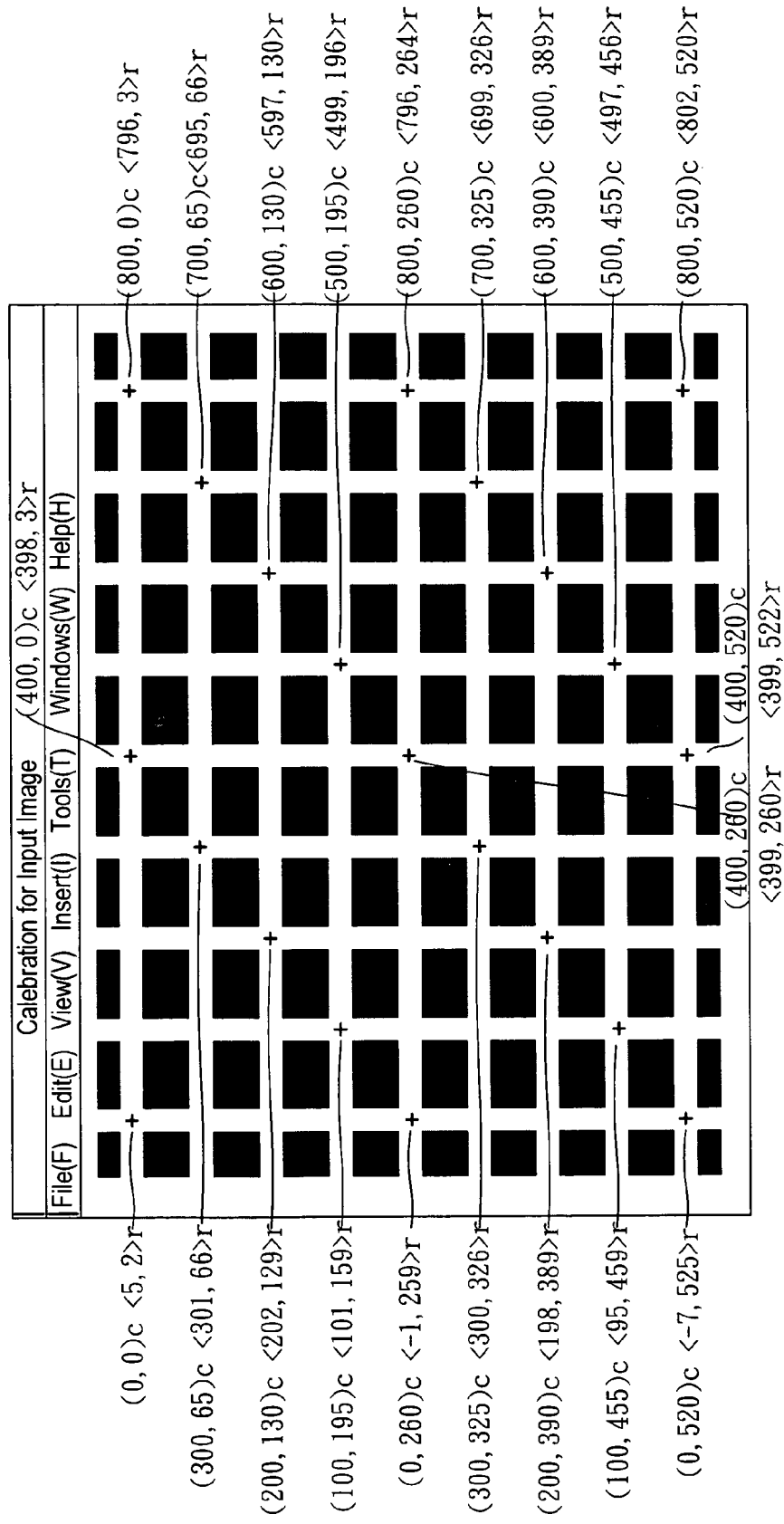
FIG. 3 is a schematic chart of inverse computation of image at alignment points corresponding to screen coordinates using alignment data in accordance with the invention.

After the camera 150 is calibrated completely, the system on work can compute coordinates of the screen corresponding to a known image (spot). FIG. 3 is an example of inverse computation of image at calibration points corresponding to screen coordinates using calibration data. In FIG. 3, (xc, yc)c is real screen coordinate to calibration point c and <xr, yr>r is screen coordinate of inverse computation.

Figure 4:
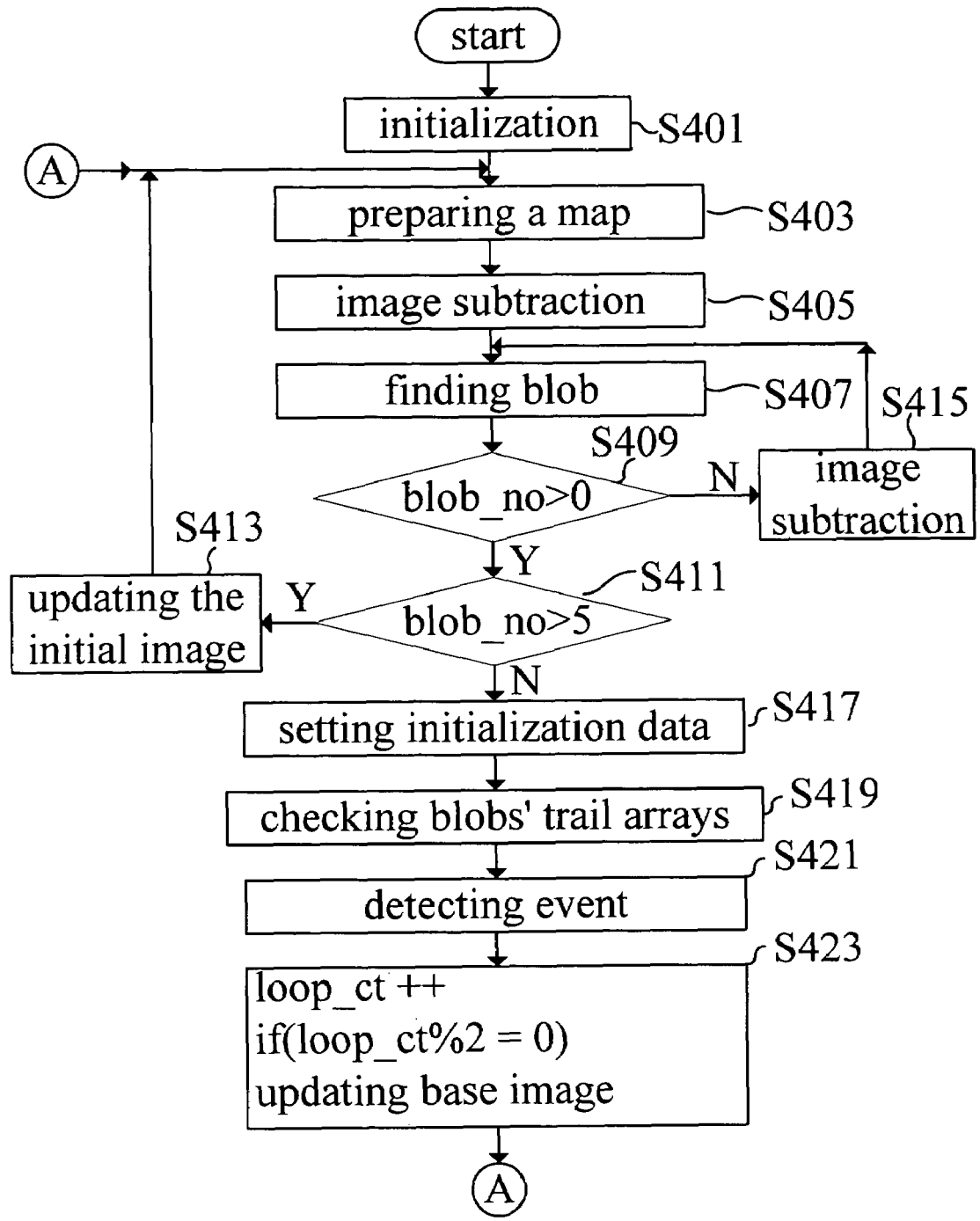
FIG. 4 is a flowchart of a detection method for a multi-trail spot click-event in accordance with the invention.

FIG. 4 is a flowchart of the multi-trail spot click-event detection method. As shown in FIG. 4, an initialization step is performed (step S401) after start or after trail array reset at occurrence of click-event. In step S401, a loop counter is set to 0 (loop_ct=0) and the camera 150 captures a current image and records it as a base image and an initial image. The base image is updated every n loops (in this embodiment, n=2, namely loop_ct % 2=0), and the initial image is updated only when a click-event is detected or the current image has a lot of noises.

In step S403, it prepares a map having the same size as the image captured by the camera 150. In step S405, it performs one-to-one subtraction of pixels' brightness values of the current image and the base image. In this case, a threshold (around 30~60) can be applied for the one-to-one subtraction of pixels' brightness values. When the resulting brightness difference is greater than the threshold, its corresponding pixel on the map is set to "1", otherwise, to "0".

In step S407, it finds all blobs consisting of "1" on the map using blob finding technology and checks the blobs for omitting unreasonable spots, namely blobs have areas too small or too big. The remainders represent suitable spots' blob data and accordingly the blob number is recorded as blob_no.

In step S409, it determines if the blob number is greater than 0, and if yes, it represents one or more candidate spots (possible spots) exist in the current image. Next, in step S411, it further determines if the blob number is greater than a predetermined number Max_No (such as an example of 5), and if yes, it represents a lot of noises in the current image. Thus, in step S413, it updates the initial image and subsequently the procedure returns to step S403. When the blob number is not greater than the Max_No, step S417 is performed.

On the other hand, in step S409, if it determines that the blob number is not greater than 0, it may represent stationary spots. Then, in step S415, it performs one-to-one subtraction of pixels' brightness values of the current image and the initial image. If the resulting brightness difference is greater than the threshold, corresponding pixel on the map is set to "1", otherwise, to "0", and return to step S407.

In the inventive method, a trail array trail_array[Max_trail] is reserved, where Max_trail is allowed maximum trail number (namely, the number of possible spots concurrently appearing in a current image). In addition, a counter total_trail is implemented to count current trail number.

For some of blob_no with more than one possible spots found, in step S417, it sets initialization data for corresponding trail arrays. For example, central position and area of an i-th blob are set to corresponding fields of trail array trail_array[i].

Steps S401 to S417 are provided to find blobs indicative of possible spots. The inventive method has designed a configuration of infinitive thread loop. Accordingly, one or more blobs indicative of possible spots are found in every loop. Each of the blobs is checked to decide to which trail array (supposing, i-th) belongs to, and thus the i-th trail array is updated and other trail arrays are updated as null data (set area=0). If a blob does not belong to all existing trail arrays, a new trail array trail-array[k] (the k-th trail array) for the blob is added to store data associated with the blob.

In step S419, it performs the check for the blobs' trail arrays. This is based on principles: (1) a ratio of blob areas found by every loop to previous areas recorded in area field of corresponding trail array ranges between 0.5 and 2.0; (2) in the trail arrays met with principle (1), a minimum trail array trail-array[i] (supposing, with the minimum distance min_d) is found; and principle (3) if the minimum distance min_d is smaller than a predetermined moving distance Move_dist, the current blob is belonged to the trail array trail-array[i], otherwise, a new trail-array is added to save data associated with the current blob. Principle (1) essentially increases accuracy by approximating the blob areas found in every loop to previous blob areas of its trail array.

If no blob is found in a loop, fields of all trail arrays are set to null indicative of no data (step S415). If blob number found in a loop is greater than the maximum trail number Max_trail, it represents a lot of noises in current image and step S413 is performed to reset trail arrays and re-find an appropriate trail array.

After step S419 is complete, all blobs found in every loop can be classified into a trail array. The resulting data generated by detecting a trail of all current possible spots is recorded in a trail array. In this case, area data of a spot of the trail array can determine if the spot presents in a loop, which represents no spot when area is 0. An event is defined by determining present/absent states of a spot in consecutive loops.

In this embodiment, six spot event states are defined as follows:

<1> a state E_NONE of spot absent (start state),
<2> a state E_OFF_ON of spot present,
<3> a state E_ON_OFF of spot disappear (originally at the state E_OFF_ON),
<4> a state E_DWELL_ON of spot stilling in a small range,
<5> a state E_DWELL_OFF of spot left the state E_DWEKK_ON (but the spot still exists), and
<6> a state E_ACTION of spot acting as "click" (i.e., the state from E_DWELL_ON to E_NONE).

Figure 5A:
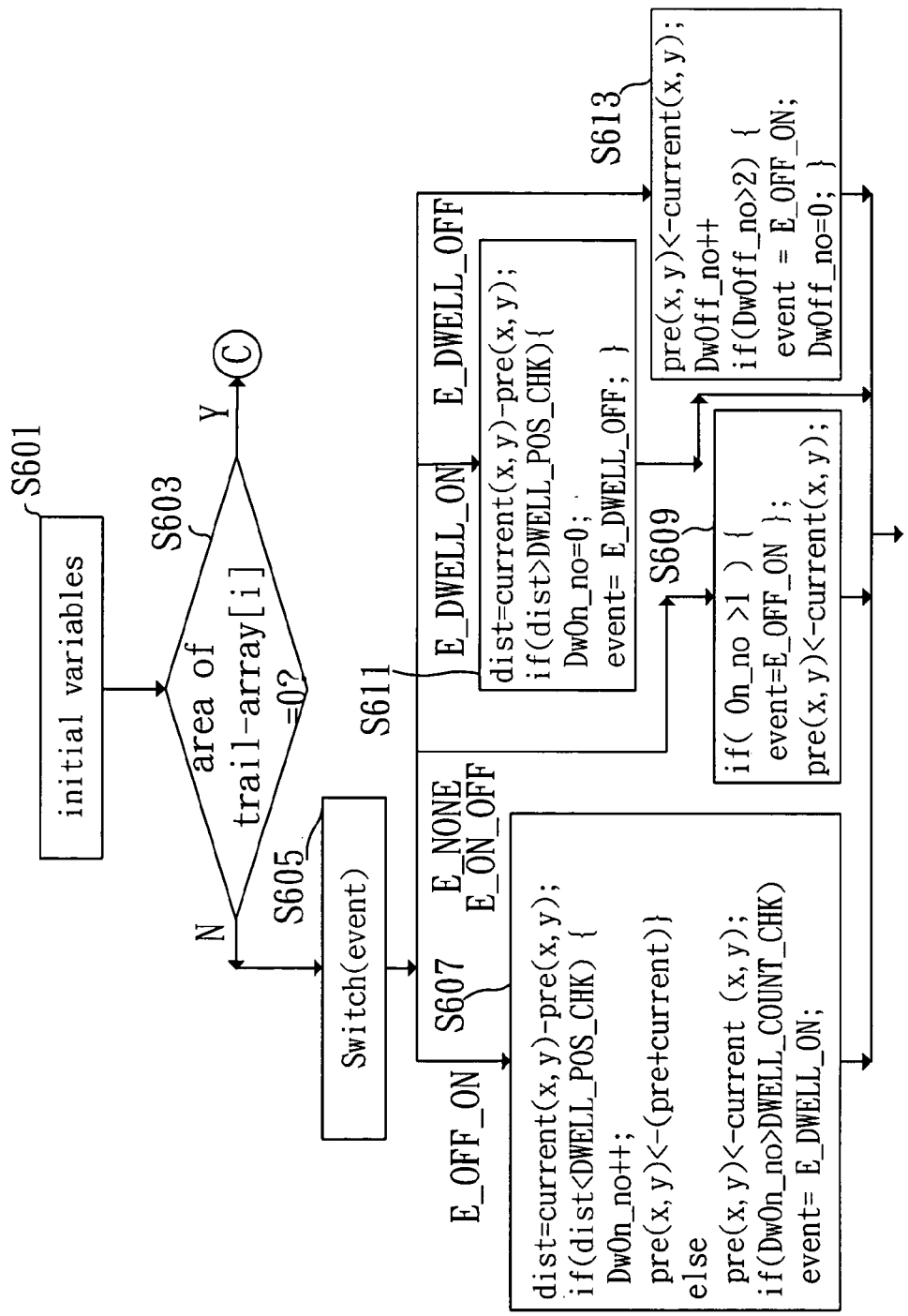
FIGS. 5A and 5B are flowcharts of the detail of FIG. 4 in accordance with the invention.

In every detection loop, the trail array for every spot can stay only one of the six states. State change is determined by a current spot present/absent and previous state. FIG. 5A shows a detail flowchart of event detection of step S421. As shown in FIG. 5A, in step S601, it sets initial variables, by which the variable 'event' is set to the spot absent state (event=E_NONE), the variables 'On_no', 'Off_no' and 'DwOn_no' and 'DwOFF_no' are set to zero (On_no=Off_no=DwOn_no=DwOFF_no=0), and the variable pre(x,y) is set to (0,0) (pre(x,y)=(0,0)), wherein On_no is number of spot present, Off_no is number of spot absent, pre(x,y) is previous loop position of spot in a same spot trail, and current(x,y) is current loop position of spot in the same spot trail.

In step S603, it determines if an area of a trail array trail-array[i] is 0, and if not, it represents a spot exists and thus step S605 is performed. In step S605, it adds the variable On_on by 1 and accordingly performs related steps. That is, when event state variable event=E_OFF_ON, step S607 is performed; when event=E_NONE or E_ON_OFF, step S609 is performed; when event=E_DWELL_ON, step S611 is performed; and when event=E_DWELL_OFF, step S613 is performed.

Step S607 calculates the distance between the previous loop position pre(x, y) of a spot and the current loop position (x, y) of the spot, thereby finding a moving distance of the spot(notes as dist=current(x, y)-pre(x, y)). If the moving distance is smaller than a predetermined range DWELL_POS_CHK, it represents that the spot stills in a local area and thus the variable DwOn_no is increased by 1. When DwOn_no exceeds a predetermined threshold DWELL_COUNT_CHK (such as 6), event state variable is transited to a state that the spot stills in a small range, namely event=E_DWELL_ON.

In step S609, when event=E_NONE or E_ON_OFF and a spot consecutively presents twice (On_no>1), event state variable is set to the state of the spot present (event=E_OFF_ON) and the previous loop position is updated as the current loop position (pre(x, y)=current(x, y)) for the next computation.

For a same spot trail, step S611 subtracts the previous loop position pre(x, y) from the current loop position current (x, y) to thus obtain a moving distance of the spot. If the moving distance is greater than a predetermined range (DWELL_POS_CHK), it represents that the spot does not stay in a local area. In this case, the number of DwOn_no is reset to 0 and event state variable is set to the state of the spot left the local area (event=E_DWELL_OFF).

For the same spot trail, step S613 sets the previous loop position pre(x, y) of the spot equal to the current loop position current(x, y) of the spot, and variable DwOFF_no is increased by 1. When DwOFF_no>0, event state variable becomes the state of spot present (event=E_OFF_ON) and variable DwOFF is reset to 0.

Figure 5B:
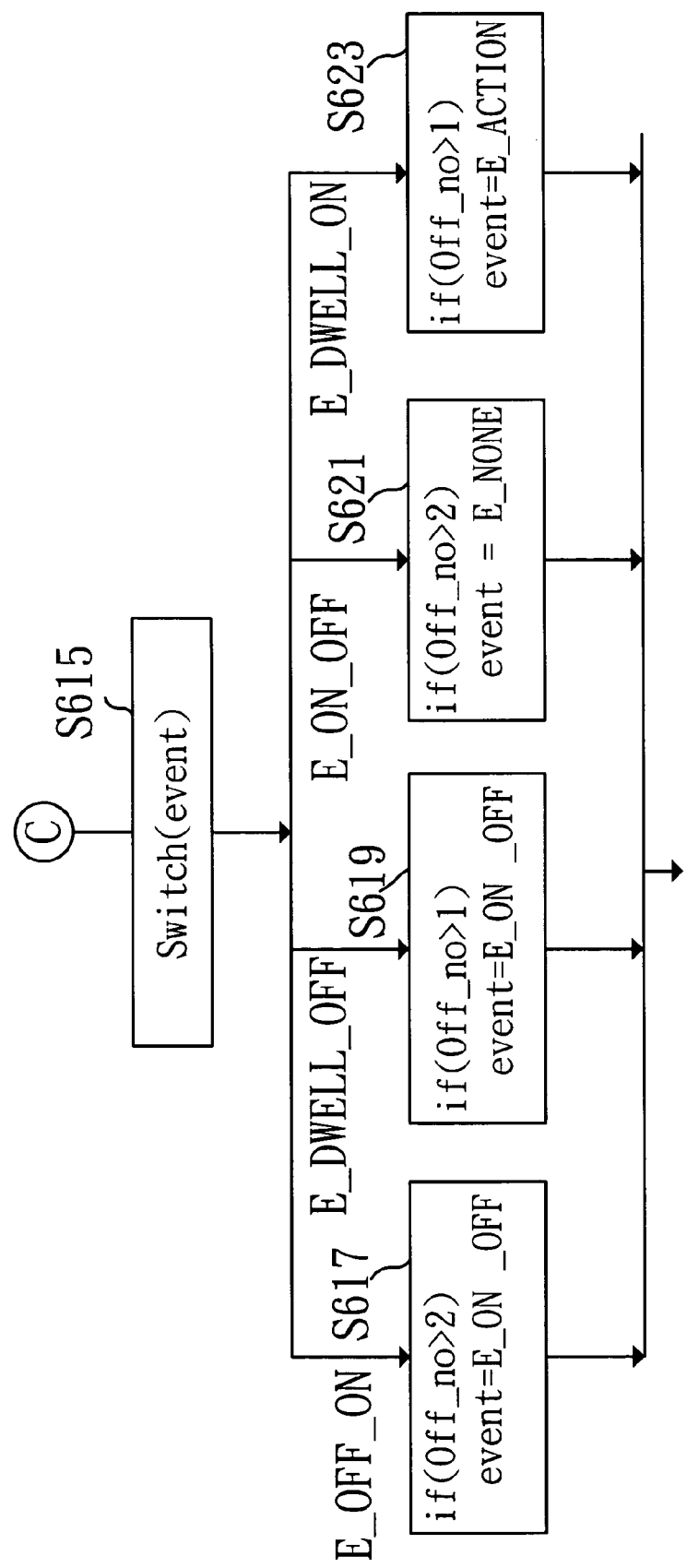

Step S603 determines if an area field "area" of a trail array trail-array[i] is 0, and if yes, it represents no spot, and then step S615 is performed(FIG. 5B). First, step S615 increases Off_no by 1, then, it performs one of following condition branches: going to step S617 when event=E_OFF_ON; going to step S619 when event=E_DWELL_OFF; going to step S621 when event=E_ON_OFF; or going to step S623 when event=E_DWELL_ON.

In step S617, when variable OFF_no>2, variable event=E_ON_OFF. In step S619, when OFF_no>1, event=E_ON_OFF. In step S621, when Off_no>2, event=E_NONE.

In step S623, when variable event=E_DWELL_ON and the spot consecutively disappears twice (Off_no>1), it represents that a "click" event occurs (event=E_ACTION). At this point, the host 110 is notified to provide an appropriate event response and concurrently step S423 is performed to start a new cycle by resetting the trail arrays, counter, base and initial images for detection.

As cited, the invention applies a laser candidate spot (may be a real spots or noise) for detection. The detection result is stored in a trail array. Next, event state check is performed to determine if a "click" event occurs. When the "click" event occurs, an interactive module is notified to update the screen' content and reset data in the trail array. Conversely, when the "click" event does not occur, the cited detection, store and check operations are performed cyclically. Accordingly, the invention can avoid the prior problems that a spot stilling in a fixed small area cannot be detected and the "learning" step causes an inconvenience.

Although the present invention has been explained in relation to its preferred embodiment, it is to be understood that many other possible modifications and variations can be made without departing from the spirit and scope of the invention as hereinafter claimed.

What is claimed is:

1. A multi-trail spot click-event detection method, which applies a spot to perform click event operation on a display screen and uses a camera, connected to a host, to capture multiple images from the display screen at consecutive time points, comprising the steps:

a possible spot finding step, which subtracts every two consecutive images captured by the camera to thus obtain difference images, and selects pixels of each difference image with brightness in a first determined range to thus form blobs;

a possible spot determining step, which finds a first blob from the blobs of each difference image that has an area in a second predetermined range, and regards spots of the first blob found as possible spots;

a multi-trail handling step, which sets start data for at least one trail array and subsequently classifies the first blob in each difference image into the at least one trail array; and a spot click-event detecting step, which determines if there is a spot in a consecutive blob of the at least one trail array in accordance with the consecutive blob of the at least one trail array existing at a next time point or not, and thus decides that a spot click-event occurs when the spot is absent at the next time point immediately after the spot is presented.

2. The detection method as claimed in claim 1, wherein the spot is emitted by a laser pen.

3. The detection method as claimed in claim 1, wherein in the possible spot determining step, a spot determining step is further performed when blob number is 0, which decides that the spot does not exist or the spot stills at original position in each difference image.

4. The detection method as claimed in claim 1, wherein in the multi-trail handling step, the start data comprises the first blob's central position, area and corresponding spot trail state.

5. The detection method as claimed in claim 1, wherein in the multi-trail handling step, the number of trail arrays equals to the number of possible spots concurrently appearing on each difference image.

6. The detection method as claimed in claim 1, wherein in the multi-trail handling step, a check and classification principle is applied to classify the first blob into a trail array, which is performed by classifying a blob of a trail array that meets with the smallest distance to the first blob into the trail array.

7. The detection method as claimed in claim 1, wherein in the multi-trail handling step, a check and classification principle is applied to classify the first blob into a trail array, which is performed by classifying a blob of a trail array that meets with a ratio of its area to the first blob's areas the closest to 1 into the trail array.

8. The detection method as claimed in claim 1, wherein in the multi-trail handling step, a check and classification principle is applied to classify the first blob into a trail array, which is performed by classifying a blob of a trail array that meets with the smallest distance to the first blob and a ratio of its area to the first blob's areas the closest to 1 into the trail array.

9. The detection method as claimed in claim 1, wherein in the spot click-event detecting step, a spot click-event is generated when a spot of one of the at least one trail arrays is changed to a no spot state from a spot still state, the no spot state representing no spot existing in a trail array, and the spot still state representing a spot stilling in a specific size of area.

10. The detection method as claimed in claim 9, wherein one of the at least one trail arrays generates a spot click-event, and the at least one arrays are reset to re-execute the possible spot finding step.

* * * * *